United States Patent [19]

Hobbs

[11] 4,314,693
[45] Feb. 9, 1982

[54] DEVICE FOR ARBORIST CONTRACTORS

[76] Inventor: Edwin L. Hobbs, P.O. Box 295, Moraga, Calif. 94556

[21] Appl. No.: 159,103

[22] Filed: Jun. 13, 1980

[51] Int. Cl.³ .............................................. B66D 3/00
[52] U.S. Cl. .................................... 254/376; 254/380
[58] Field of Search .............. 254/376, 375, 380, 382, 254/202, 213, 214, 217, 222, 223, 224, 227, 357, 278, 283, 293; 414/23

[56] References Cited

U.S. PATENT DOCUMENTS

| | | | |
|---|---|---|---|
| 849,256 | 4/1907 | Moore | 254/223 X |
| 1,056,303 | 3/1913 | Riley | 254/213 |
| 2,572,516 | 10/1951 | Randolph | 254/380 |
| 2,929,494 | 3/1960 | Lombardi | 254/380 X |
| 2,946,563 | 7/1960 | Eaton | 254/217 X |
| 3,977,652 | 8/1976 | Mauch | 254/375 |

*Primary Examiner*—John M. Jillions
*Attorney, Agent, or Firm*—James R. Cypher

[57] ABSTRACT

A load handling device for arborists attachable temporarily to a tree trunk for lowering severed tree limbs and main stems including a base having a cross member and a vertical member. An elongated leg protrudes from the cross member and frictionally engages the tree trunk. A cylindrical member is mounted on the vertical member above the elongated tree gripping leg and is positioned with its longitudinal axis generally at right angles to the base member. The rope used to lower the severed tree limb is wrapped about the cylindrical member. An upper flange is connected to the vertical member above the cylindrical member and protrudes from the base a greater distance than the tree gripping leg so that the cylindrical member is tipped with its longitudinal axis at an angle below a horizontal plane. The device is frictionally held to the tree trunk by an elongated flexible member such as a strap. Cinching means mounted on the cross member holds the flexible member securely to the tree.

4 Claims, 5 Drawing Figures

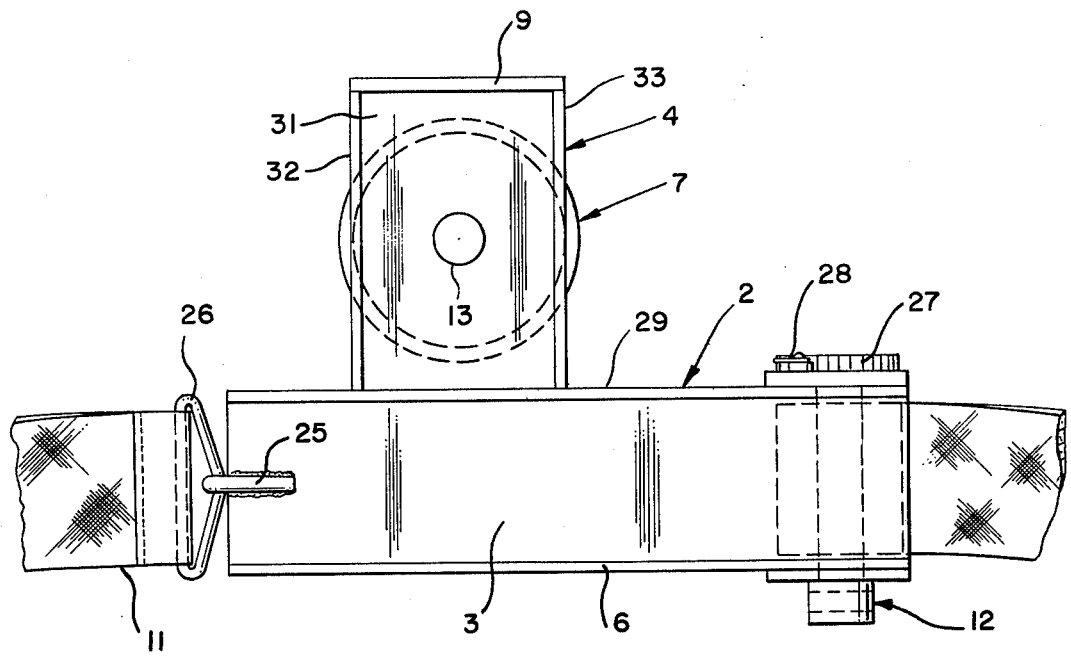
FIG. 5
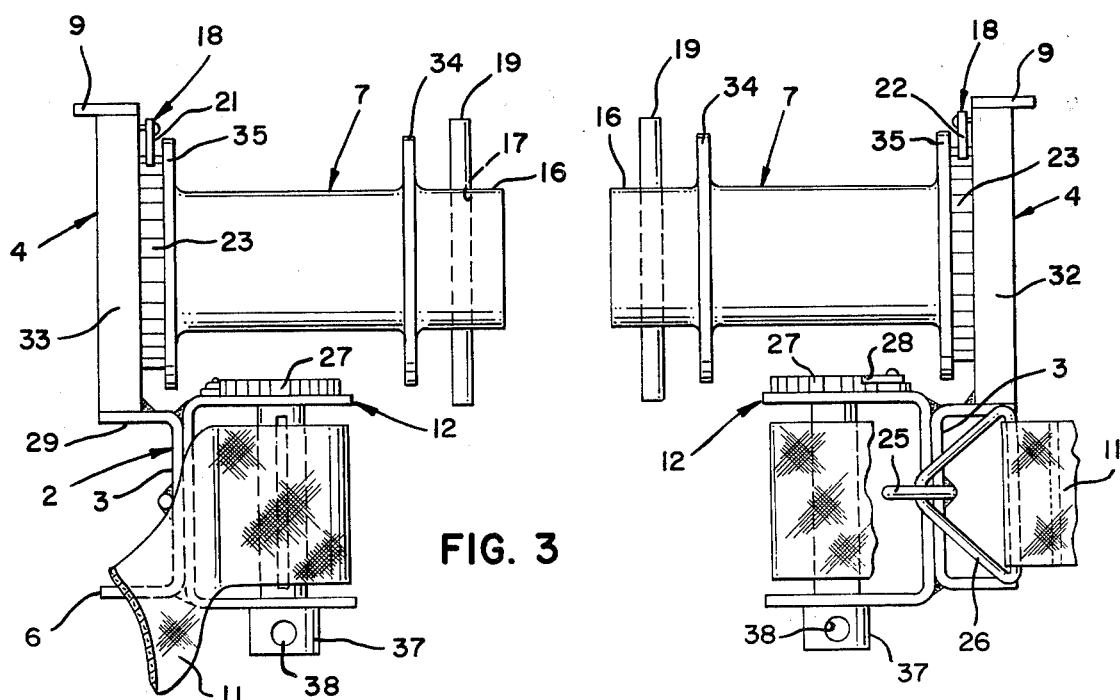
FIG. 3
FIG. 4

DEVICE FOR ARBORIST CONTRACTORS

BACKGROUND OF THE INVENTION

In my co-pending patent application entitled LOAD HANDLING DEVICE FOR ARBORISTS filed Apr. 30, 1979, now U.S. Pat. No. 4,239,188, I described a device which was temporarily secured to the trunk of the tree for lowering heavy tree limbs and main stems. Both forms of the invention described in the co-pending application damaged the tree to some extent either because a spike was driven into the tree or a notch was actually formed in the tree with a chain saw. The devices disclosed in the co-pending application are used for very heavy work or where the entire tree is to be removed. There is no lowering device in the prior art aside from my co-pending application known to applicant specifically used for lowering severed tree limbs or main stems.

SUMMARY OF THE INVENTION

The main purpose of the present invention is to provide a device for lowering severed tree limbs and main stems which does not permanently injure the tree. The device can be attached to a tree trunk without any prior notching or slashing of the tree trunk.

Still another object of the present invention is to provide a device which positions the load lowering rope on the cylindrical member at a point closest to the tree.

A further object is to provide a device as described which positions the cylindrical member above the cinching apparatus enabling the arborist to operate the device more easily and with greater safety.

BRIEF DESCRIPTION OF THE DRAWINGS

FIG. 3 is an end view of the device taken along line 3—3 of FIG. 2.

FIG. 4 is an end view of the device taken along line 4—4 of FIG. 2.

FIG. 5 is a side view of the device taken along line 5—5 of FIG. 2.

DESCRIPTION OF THE PREFERRED FORM OF THE INVENTION

Figure 1:
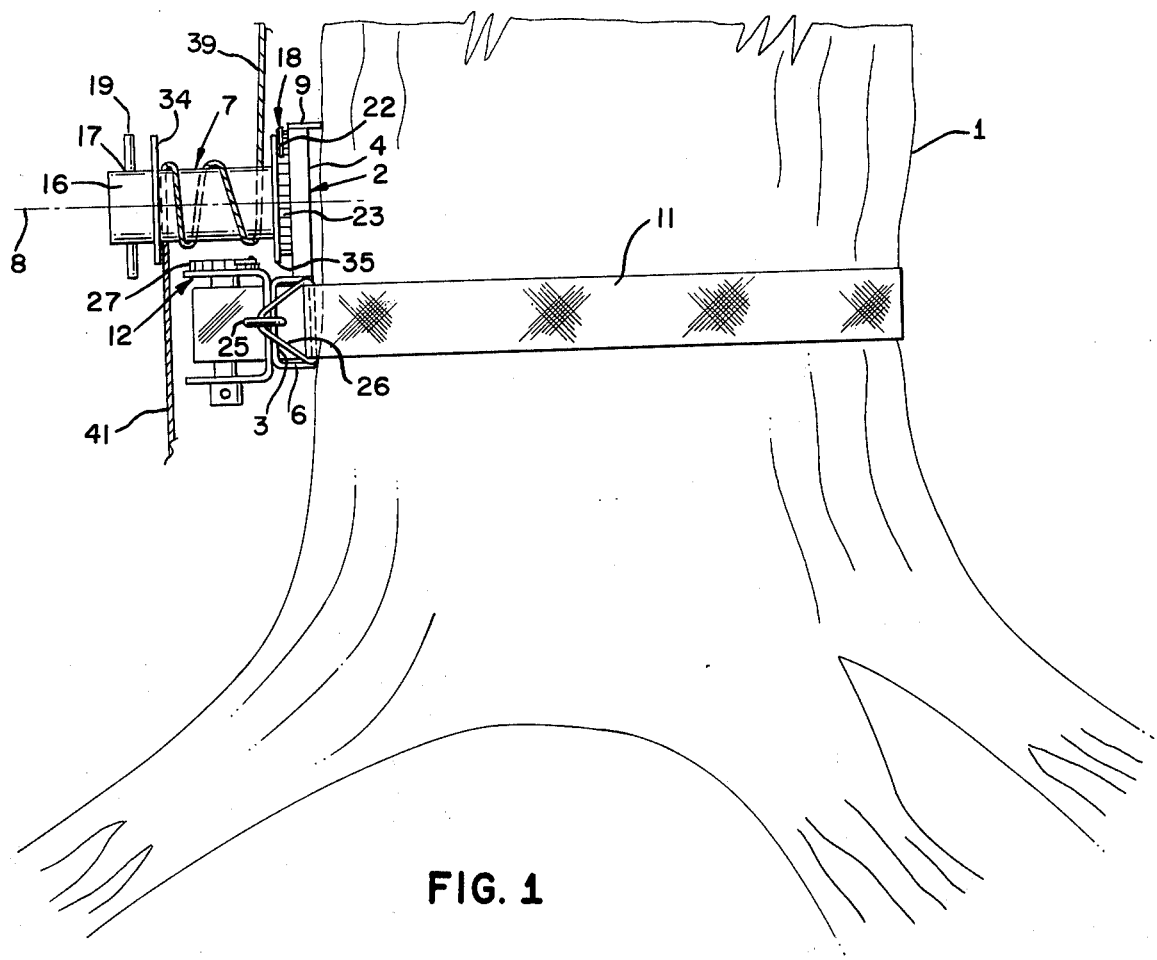
FIG. 1 is an elevation view of the device of the present invention positioned on a tree for lowering the severed limb or main stem.
Figure 2:
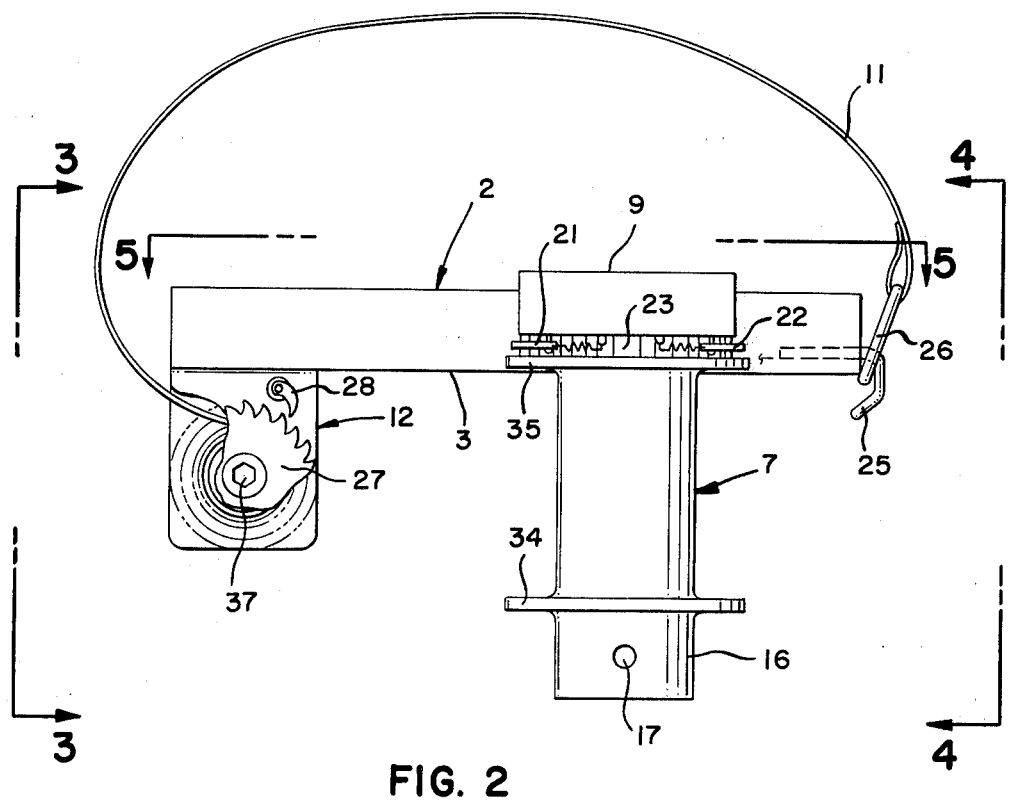
FIG. 2 is a top plan view of the device shown in FIG. 1.

The load handling device for lowering severed tree limbs and main stems consists briefly of a base 2 having a cross member 3 and a vertical member 4 including an elongated leg 6 protruding from the cross member adapted for frictional engagement with the tree trunk 1. A cylindrical member 7 is mounted on the vertical member above the elongated leg and is positioned with its longitudinal axis 8 generally at right angles to the base. An upper flange 9 is connected to the vertical member above the cylindrical member protruding from the base a distance greater than the leg and adapted for resting against the tree trunk so as to tilt the longitudinal axis of the cylindrical member at an angle below a horizontal plane. An elongated flexible member 11 is connected to the cross member and is adapted for encircling the tree trunk. A cinching means 12 is mounted on the cross member for engaging the elongated member for securely holding the device to the tree.

In another form of the invention, axle 13 is connected at a right angle to the base. The cylindrical member is formed with an extension 16 and is mounted for rotation on the axle and formed with a pin opening 17. Ratchet means 18 mounted on the vertical member and cylindrical member selectively prevents rotation of the cylindrical member in at least one direction. A pin member 19 is dimensioned for receipt within the opening in the cylinder member extension for manually turning the cylindrical member.

In still another form of the invention, a pair of ratchet pawls 21 and 22 are connected to the vertical member for selectively engaging the ratchet means 23 for preventing rotation of the cylindrical member in both directions.

The load handling device is preferably formed with a hook 25 connected to the cross member and spaced from the cinch means. Catch means such as a "V" ring 26 is mounted on the end of the elongated member 11 for engagement with the hook means 25. The cinch means includes a ratchet 27 and a pawl 28 for holding the strap at a preset position.

The cross member 3 may be constructed from a channel member having a lower leg 6 and an upper leg 29. The lower leg 6 forms the elongated leg which frictionally engages the tree and upper leg 29 serves as an attachment member for the vertical member 4 which includes a plate 31 and stiffening side flanges 32 and 33 as shown in FIG. 5. The cylindrical member 7 is preferably formed with annular flanges 34 and 35 to prevent the rope from slipping off the cylindrical member.

The device is attached to the tree trunk 1 by placing the elongated leg 6 against the trunk of a tree. Upper flange 9 is placed against the tree at a higher elevation. Strap 11 is unwound from reel 37 and wrapped around the trunk of the tree. V-ring 26 is then coupled to hook 25. A bar (not shown) is inserted through opening 38 in reel 37 and turned so that strap 11 winds back upon reel 37 until the strap is very tight around the trunk. Pawl 28 then engages ratchet 27 to hold the strap.

Since upper flange 9 protrudes from the base member further than the elongated leg 6, axis 8 of the cylindrical member tilts at at angle below the horizontal.

In operation, a block and tackle (not shown) is attached to a strong upper limb. A rope 39 is then inserted through the pulley and one end is attached to the limb to be severed and the other end 41 is wrapped around the cylindrical member with several turns as shown in FIG. 1. Both pawls 21 and 22 should be set to prevent ratchet 23 and cylindrical member 7 from turning. A half hitch can be placed in the rope about the cylindrical member to secure the rope from moving from the cylindrical member. As soon as the upper limb has been severed by the arborist, the half hitch can be taken out of the rope and one then can easily permit the rope to slide around the cylindrical member thus lowering the limb to the ground. The heavier the limb, the more turns of the rope will be necessary so that one person can control the descent of the limb. It is merely the friction of the rope on the cylindrical member which permits one man to operate the device.

If while lowering a limb, it becomes caught and it is necessary to raise the limb slightly, the device can be used like an ordinary winch to raise the limb slightly while it is worked free. This can be done by placing a leverage pin 19 through openings 17 and releasing one pawl 21 or 22 so that the drum can be turned in one direction. As soon as the limb is raised sufficiently, the other pawl can be set and the limb lowered in the usual manner.

An important feature of the invention is the fact that by tilting the drum downwardly, the rope 39 holding the load remains adjacent annular flange 35 which is closest to the tree. Keeping the load bearing rope close to the tree minimizes the moment forces on the axle 13.

In the present invention, the cylindrical member 7 is mounted above the cinch means 12. The separation permits easier wrapping of the rope about the cylindrical member and as the limb is lowered, there is less tendency for the cinching means to interfere with the movement of the rope.

I claim:

1. A load handling device for arborists attachable temporarily to a tree trunk for lowering tree limbs and main stems on a rope comprising:
   a. a base having a cross member and a vertical member including an elongated leg protruding from said cross member adapted for frictional engagement with said tree trunk;
   b. a cylindrical member mounted on said vertical member above said elongated leg and positioned with its longitudinal axis generally at right angles to said base; and adapted for receiving one or more turns of said rope for selectively holding said rope and for providing sliding frictional engagement therewith;
   c. an upper flange connected to said vertical member above said cylindrical member protruding from said base a distance greater than said leg and adapted for resting against said tree trunk so as to tilt said longitudinal axis of said cylindrical member at an angle below a horizontal plane;
   d. an elongated flexible member connected to said cross member and adapted for encircling said tree trunk; and
   e. cinch means mounted on said cross member for engaging said elongated member for securely holding said elongated member and said device to said tree.

2. A device as described in claim 1 comprising:
   a. an axle connected to a right angle to said base;
   b. said cylindrical member is mounted for rotation on said axle, and is formed with an extension member having a pin opening;
   c. ratchet means mounted on said vertical member and said cylindrical member selectively preventing rotation of said cylindrical member in at least one direction; and
   d. a pin member dimensioned for receipt within said opening in said cylindrical member extension for manually turning said cylindrical member.

3. A device as described in claim 2 comprising:
   a. a pair of ratchet pawls connected to said vertical member for selectively engaging said ratchet means for preventing rotation of said cylindrical member in both directions.

4. A load handling device as described in claim 3 comprising:
   a. hook means mounted on said cross member spaced from said cinch means;
   b. catch means mounted on the end of said elongated member for engagement with said hook means; and
   c. said cinch means includes a ratchet and pawl for holding said strap at a preset position.

* * * * *